(12) United States Patent
Kouznetsov et al.

(10) Patent No.: US 7,771,681 B2
(45) Date of Patent: Aug. 10, 2010

(54) METHOD FOR IMPROVED ALUMINUM HYDROXIDE PRODUCTION

(75) Inventors: Dmitri L. Kouznetsov, Aurora, IL (US); Jianjun Liu, Aurora, IL (US); David H. Slinkman, Lombard, IL (US)

(73) Assignee: Nalco Company, Naperville, IL (US)

( * ) Notice: Subject to any disclaimer, the term of this patent is extended or adjusted under 35 U.S.C. 154(b) by 887 days.

(21) Appl. No.: 11/618,451

(22) Filed: Dec. 29, 2006

(65) Prior Publication Data
US 2008/0159934 A1    Jul. 3, 2008

(51) Int. Cl.
*C02F 1/00* (2006.01)
(52) U.S. Cl. .................. 423/121; 423/122; 423/127; 423/130; 423/625; 423/629; 23/300; 23/305 A; 210/729; 210/730
(58) Field of Classification Search ............. 423/121, 423/122, 127, 130, 625, 629; 23/300, 305 A; 210/729, 730
See application file for complete search history.

(56) References Cited

U.S. PATENT DOCUMENTS

| 3,445,386 A | 5/1969 | Otto et al. |
| 3,642,437 A | 2/1972 | Angstadt et al. |
| 3,912,764 A | 10/1975 | Palmer |
| 4,110,349 A | 8/1978 | Cohen |
| 4,256,709 A | 3/1981 | Sizyakov et al. |
| 4,737,352 A | 4/1988 | Owen et al. |
| 5,041,622 A | 8/1991 | LeSuer |
| 5,275,628 A | 1/1994 | Dimas et al. |
| 2002/0159936 A1 * | 10/2002 | Mahoney et al. ............ 423/111 |

FOREIGN PATENT DOCUMENTS

| RU | 2181695 | 4/2002 |
| RU | 2184703 | 7/2002 |
| RU | 2257347 | 7/2005 |

* cited by examiner

*Primary Examiner*—Steven Bos
(74) *Attorney, Agent, or Firm*—Michael B. Martin

(57) ABSTRACT

The present invention relates ways to increase the output of a high quality product from the aluminum hydroxide recovery processes such as the Bayer process. The invention is a method of increasing the size of precipitated aluminum hydroxide while not reducing the total production amounts. The invention relates to the use of a crystal growth modifier compositions added to the precipitation liquor to increase the particle size distribution of the precipitated alumina trihydrate.

23 Claims, No Drawings

METHOD FOR IMPROVED ALUMINUM HYDROXIDE PRODUCTION

FIELD OF THE INVENTION

The present invention relates to improved recovery of aluminum values from the aluminum hydroxide production process such as the Bayer process. In particular, the invention relates to the compositions and methods providing the increase of particle size of aluminum hydroxide product without a significant decrease in precipitation yield.

BACKGROUND OF THE INVENTION

Aluminum hydroxide is produced on an industrial scale by well-established methods such as the Bayer process. The precipitation process operators optimize their methods so as to produce the greatest possible yield from the aluminate process liquors while trying to achieve a given crystal size distribution of aluminum hydroxide product. It is desirable in most instances to obtain the product of relatively large crystal size since this is beneficial in subsequent processing steps required to produce aluminum metal. Production is often limited by processing conditions under which the crystallization and precipitation is conducted. These processing conditions vary from one plant to the next and include, but are not limited to, temperature profiles, seed charge, seed crystal surface area, purge of carbon dioxide or flue gases, liquor loading, liquor purity, and the like.

Extensive efforts have been invested into finding chemical additives and methods limiting the factors negatively affecting particle size and yield in order to achieve the optimal economic recovery of aluminum hydroxide product. One of such factors is the presence of oxalate anion in the precipitation liquor. Sodium oxalate crystallizes and co-precipitates from solution over essentially the same temperature profiles, as does the desirable aluminum hydroxide product. If left undealt with, oxalate precipitation results in a decrease of the average particle size and yield of aluminum hydroxide product through a number of mechanisms. Oxalate crystals act as seed sites resulting in generation of undersized aluminum hydroxide crystals during the precipitation stage. Oxalate crystals adhere to the surfaces of growing aluminum hydroxide and incorporate within the precipitated product agglomerates. Thus created agglomerates disintegrate during the washing and calcination stages that follow. Also, under certain conditions, these agglomerates grow to significant sizes (sometimes greater than 0.5 inch) and accumulate at the bottom of precipitation vessels hindering mixing. The removal of these agglomerates results in shutdowns for cleaning as well as the loss of aluminum values.

Therefore, effective oxalate removal from the process is crucial for economical recovery of a high quality aluminum hydroxide product.

Washing with water the fine aluminum hydroxide returning to the process as seed is a common method of oxalate removal. Untreated precipitation liquors yield sodium oxalate crystals with needle like morphology that incorporate into the aluminum hydroxide product as mentioned above. Organic crystal growth modifiers are known to force oxalate crystallize as spherical agglomerates of such needles also known as "oxalate balls." For the seed washing method, it is desirable that these balls do not overgrow the size that can be effectively dissolved in the duration of the washing stage.

Another common method of oxalate removal is the side-stream destruction. This method requires that oxalate does not crystallize during the precipitation stage, but rather is carried with the spent liquor until removal. Commonly in this method, oxalate is removed by precipitation in a side stream circuit, and therefore, it is also critical that a crystal growth modifier does not act as an oxalate precipitation poison.

Despite the continuous and ongoing development worldwide, the industry demands for economical resolution of the above-described process needs remain unfulfilled. A method of such resolution suitable for obtaining aluminum hydroxide crystals with increased particle size and yield, while facilitating oxalate removal is provided by the present invention.

SUMMARY OF THE INVENTION

To satisfy the industry needs identified above, a method and compositions for obtaining aluminum hydroxide crystals with increased particle size and yield, while facilitating oxalate removal have been developed.

According to the method of the present invention, the suitable compositions are blended and introduced into the process through in-line injection in an amount effective to obtain the changes desired. The compositions are introduced in their primary form without any further preparation or as water emulsions.

The principal ingredients of the suitable compositions are the oligomeric or polymeric compounds with a single or multiple carboxylic groups produced through ene or Diels Alder synthesis. Suitable can be such oligomeric or polymeric compounds, their precursors, salts, and derivatives such as amides, esters or blends thereof.

In one embodiment of the present invention the principal ingredient is introduced neat or as a carefully prepared water emulsion. In another embodiment the principal ingredient is first blended with an oil carrier and then introduced into the process neat or as a water emulsion.

DETAILED DESCRIPTION OF THE INVENTION

The following are definitions that apply to the relevant terms as used throughout this specification.

A: Stands for aluminum concentration expressed as g/L $Al_2O_3$

C: Stands for sodium hydroxide or caustic concentration expressed as g/L $Na_2CO_3$ S: Stands for total alkali concentration expressed as g/L $Na_2CO_3$ A/C: Refers to the alumina to caustic ratio BET: Refers to the Brunauer-Emmett-Teller method for experimental determination of surface area. The method employs the analysis of adsorption isotherm of nitrogen or other gases on the material.

SEM: This acronym stands for "scanning electron microscope."

CGM: This acronym stands for "crystal growth modifier."

Commercial Product: Describes a crystal growth modifier incorporating fatty acids with chains of greater than ten carbons. The Commercial Product discussed in the Examples is available from Nalco Company, Naperville, Ill. as Nalco Product No. 7837.

Oil carrier: Describes a hydrophobic liquid that can be comprised of the aliphatic or aromatic compounds such as paraffinic oils, naphthenic oils, or fuel oils.

Also, bottoms or residual waste materials remaining from the production of aliphatic alcohols represent a suitable hydrophobic liquid. The preferred waste material is the CIO alcohol distillation residue having a boiling point of about 250° C. (482° F.). It is light yellow to yellowish brown in color and has a specific gravity of about 0.862, OH— number about 90, SAP number about 50, weight percent acetic group about 0.07 and carbonyl group about 0.5. Chemically, it is 57-73 weight percent of primary branched chain C10-C22 alcohols (classified as fatty alcohols) and 29-41 weight percent of mixed long chain esters and ethers (C18-C33 ester; C18-C22 ether).

The materials suitable as an oil carrier can be used neat or as a mixture of any proportion. The oil carrier needs only be a solvent for the fatty acid and have a boiling point safely above the temperature of the hot aluminate liquor undergoing precipitation (about 80° C., 176° F.).

Weight percent ratio: The total weight fraction of one reagent within 100 grams of the composition or mixture. The corresponding fraction of the other component is the latter subtracted from 100.

Percent (%) increase over control quantile particle size: The particle size distribution is conventionally given by the three quantiles, d(0.1), d(0.5) and d(0.9). Thus, 10%, 50% and 90%, respectively, of the total particle volume (or mass) is less than the size given in the tables. The percent (%) increase over the control quantile particle size is the difference between the quantiles particle sizes obtained in the tests with a CGM and control divided by the control quantile particle size.

Effective amount: An effective amount is deemed any dosage of any additive that affords an increase in one of the three quantiles when compared to an undosed control sample.

Increased product yield: Describes when a greater aluminum hydroxide solid content within the precipitating vessel at the end of the precipitation run is achieved. This is generally indicated by a lower aluminum hydroxide concentration in the liquor of the corresponding vessel.

Precipitation liquor: Refers to aluminate containing liquor in an aluminum hydroxide precipitation step of an alumina production process. The aluminate liquor may be referred to as various terms known to those of ordinary skill in the art, for example, pregnant liquor, green liquor, and aluminum hydroxide precipitation feed. The Bayer process is one example of an alumina production process.

The term precipitation liquor may also include the aluminate solution directed to decomposition in a sintering-carbonation process or combined Bayer-sintering process as accomplished by the methods well known to those skilled in the art as described, for example, in U.S. Pat. Nos. 4,256,709 and 3,642,437 and RU. U.S. Pat. Nos. 2,184,703, 2,257,347, and 2,181,695, which are herein incorporated by reference.

As described in U.S. Pat. No. 4,737,352 assigned to Nalco, the invention in practice is unaffected by different proprietary precipitation techniques involving proprietary process parameters. This is of great significance because it establishes that regardless of the proprietary processing parameters maintained inside the precipitating tank, the present invention for actual practice only requires blending and in-line injection of the proposed treatment.

Precipitation feed liquor: refers to the precipitation liquor that flows into a precipitator of an aluminum hydroxide precipitation process.

Heated precipitation liquor: Any liquor within the aluminum hydroxide production process having a free alkalinity level above 50 g/L of Na2CO3 and a temperature above ambient or 25° C.

Spent liquor: Describes the liquor resulting from the removal of precipitated aluminum values, such as the spent liquor after the final classification stage that returns back to digestion in the Bayer process.

While the invention is susceptible of embodiment in many different forms, this disclosure will describe in detail preferred embodiments of the invention with the understanding that the present disclosure is to be considered as an exemplification of the principles of the invention and is not intended to limit the broad aspect of the invention to the embodiments illustrated.

The CGM treatment of the present invention incorporates the products of ene or Diels Alder synthesis derived from organic substrates of natural and synthetic origin. Thus, the suitable materials can be prepared by reacting A1: Unsaturated polycarboxylic acids, their precursors, salts, amides, esters or blends thereof with at least one of the following:

A2: Fatty acids and esters thereof of natural or synthetic origin including triglyceride oils.

A3: Polyolefins with the molecular weight in the range from about 400 to about 10,000 Daltons.

The suitable polycarboxylic acids (A1) may contain at least two replaceable hydrogen atoms per molecule. The preferable unsaturated polycarboxylic acids are maleic acid, fumaric acid, glutaconic acid, citraconic acid, mesaconic acid, aconitic acid and itaconic acid, 5-norbornene-2,3-dicarboxylic acid, 1,2,3,6-tetrahydrophthalic acid, their precursors, salts, amides, esters or blends thereof.

Fatty acids (A2) may include C6-C24 unsaturated fatty acids with a straight or branched carbon chain. Particularly preferable are palmitoleic, oleic, linoleic, linolenic, ricinoleic, eleostearic, docosahexaenoic acids, elcosapentaenoic acid, and the likes. Any combination of the unsaturated monobasic acids listed above may be used. In the synthesis of the instant materials, the fatty acids can also be used as their esters with C1-C4 alcohols, including but not limited to methyl ester or ethyl esters.

Additionally, natural esters of the fatty acids can be utilized as Reactant A2, which include crude or processed triglyceride oils of vegetable or animal origin such as soybean oil, linseed oil, castor oil, dehydrated castor oil, corn oil, safflower oil, sunflower oil, canola oil, fish oils, lard oil, beef oil, oiticica oil, tung oil, and tall oil, or their combinations. The usefulness of the fatty acids and oils is directly related to the density of double-bond in the fatty acid chains. The suitable processed oils can be those processed by means of refining, heat polymerization, isomerization-conjugation, boiling, blowing, epoxidation, dehydration, copolymerization with ethylenic monomers selected from but not limited to the group of acrylate, methacrylate, styrene, acrylamide, acrylonitrile, vinyl carboxylate esters and vinyl halides, mixtures thereof, and salts thereof. In an exemplary embodiment, the suitable oils may be the crude and refined oils available, for example, from Archer Daniels Midland Company, Decatur, Ill., USA; blown, heat polymerized in the absence of air, and boiled plant oils available, for example, from Cargill Inc., MN, USA; epoxidized oils available, for example, under the trade name Vikoflex® from ATOFINA Chemicals, Inc., PA, USA; dehydrated castor oil available, for example, under the trade name Castung from G. R. O'Shea Company, IL, USA; acrylated soybean oil available, for example, from Sartomer Company, PA, USA.

An exemplary embodiment of the present invention contemplates the use of CGM compounds produced by the reaction of maleic anhydride with unsaturated fatty acids or esters thereof including triglyceride oils of vegetable and animal origin. Such maleinization reaction is well known to those skilled in the art to form a condensation product in the presence of heat and/or pressure. Depending on the amount of the anhydride reacted, maleinization may proceed in several steps. The addition of the first mole of the anhydride may proceed through an "ene" reaction, which may result in the addition of a succinic anhydride group to the allylic functionality of the fatty chain. For the oils (and fatty acids) having more than one double bond in the fatty chains, such as linseed or soybean oil, the first step may be followed by rearrangement of the double bonds of the fatty chain into a conjugated system and addition of the second mole of the anhydride through Diels Alder reaction.

Additionally, elevated temperatures may also cause a direct intermolecular and intramolecular ene and Diels Alder reactions between the fatty acid chains of triglyceride oils, which are particularly known for natural oils rich in polyunsaturated carbon chains such as linseed, tung, and fish oils. Such ene and Diels Alder reactions can further cross-link the unsaturated fatty acid fragments forming saturated or unsaturated rings of five or six atoms, which apparently improves CGM performance of the instant materials.

Thus obtained reaction products may be further cross-linked to create higher molecular weight species useful in the present invention. Such cross-linking may be accomplished through the esterification of the anhydride functionalities with polyols. For this purpose, mono-, di-, and tri-glycerol, pentaerythritol, sorbitol, polyvinyl alcohol, alpha-methyl-O-glucoside and polyallyl alcohol can be used by those skilled in the art. The useful polyols may be bifunctional glycols or poly(alkylene) glycols derived from at least one unit selected from but not limited to the group of ethylene oxide, propylene oxide, butylene oxide, pentylene oxide, and hexylene oxide.

If subjected to alkaline hydrolysis, the CGM materials produced through the method described above generate from about 50% to 90% of the species having an average molecular weight from 500 to 10,000 Daltons and from about 10% to 50% of the species with a molecular weight in the range from 10,000 to 100,000 Daltons as determined by gel permeation chromatography.

In another embodiment of the present invention the suitable CGM materials can be produced by reacting unsaturated polycarboxylic acids A1 with olefin polymers (A3).

The suitable olefin polymers are usually those prepared by polymerization of olefins containing up to 7 carbon atoms. Polymers derived from both monoolefins and diolefins can be utilized. Suitable monoolefins include ethylene, propylene, 1-butene, 2-butene, isobutene and the pentenes, hexenes and heptenes (all isomers included). The diolefins may be conjugated or nonconjugated; suitable conjugated diolefins include butadienes, isoprene, 1,3-pentadiene and 1,3-hexadiene, and suitable nonconjugated diolefins include 1,4-pentadiene, 1,4-hexadiene and 1,5-hexadiene.

The preferred olefin polymers are those derived from monoolefins, especially mono-1-olefins and more especially C2-6 mono-1-olefins such as ethylene, propylene and the butenes. Homopolymers and interpolymers are suitable, and the interpolymers may be ordinary chain interpolymers or graft interpolymers. The preferred polymers are homopolymers and interpolymers derived from mixtures of monomers differing in size by at most about two carbon atoms, such as ethylene-propylene interpolymers and the polybutenes more fully described hereinafter.

The suitable olefin polymers can contain minor proportions of alicyclic or aromatic carbon atoms which may be derived from such monomers as cyclopentene, cyclohexene, methylene cyclopentene, methylene cyclohexene, 1,3-cyclohexadiene, norbornene, norbornadiene, cyclopentadiene, styrene and α-methylstyrene.

The olefin polymer usually contains about 30-300 and preferably about 50-250 carbon atoms. The number average molecular weight of the polymer, as determined by gel permeation chromatography, is ordinarily about 420-10,000, especially about 700-5,000 and more especially about 750-3,000.

A particularly preferred class of olefin polymers comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene which may or may not be incorporated in the polymer. Most often the isobutene units constitute 80%, preferably at least 90%, of the units in the polymer. These polybutenes are readily available commercial materials.

The preferable materials produced using olefin polymers (A3) are polyisobutenyl succinic anhydrides (PIBSA) as described, for example, in U.S. Pat. Nos. 3,445,386, 3,912,764, 4,110,349, and 5,041,622 incorporated by reference herein. Such materials, for example, derived from 1000 and 1300 molecular weight polybutenes are available from the Chevron Oronite Company, TX, under the trade names OLOA 15500 and OLOA 15667, respectively. Suitable PIBSA materials are also available from the Lubrizol Corporation, OH, under the trade names Addconate H, Addconate S, Lubrizol 5620, and others.

In one embodiment of the present invention the CGM product can be prepared as a solution of the above-described reaction products in an oil carrier. For example, a suitable carrier is paraffinic oil available from Exxon Mobil Corporation under the trade name Escaid 110.

In another embodiment, the improved CGM treatment can be prepared as water-in-oil or oil-in-water emulsion. The CGM formulations prepared as microemulsions are preferred.

Microemulsions are significantly different in structure from regular emulsions. Regular emulsions are comprised of separate oil droplets in water or water droplets in oil with a sharp transition between the two phases. Microemulsions have a particle size in the range from 10 to 600 nm, so that they appear as clear or opalescent one-phase formulations.

Unlike regular emulsions, microemulsions are thermodynamically stable. This means that microemulsions form spontaneously when the components are brought together and stay stable as long as the components are intact. Thus, their manufacturing may be reduced to simple kneading without the need for expensive high energy mixing. Also, microemulsions are not prone to separation or settling, which results in their long storage stability. Only gentle mixing is required to restore microemulsions upon their freezing or high temperature exposure.

The emulsified crystal growth modifier may be introduced into the precipitation liquor via various routes. In one embodiment, the emulsified crystal growth modifier is added to the precipitation liquor at the following steps of a Bayer process: a) to a precipitation feed liquor, b) to a seed slurry, c) directly into a precipitation tank, and d) a combination thereof.

The emulsified crystal growth modifier can be added to the precipitation liquor via various modes of addition. In-line injection of the emulsified crystal growth modifier is one mode of addition.

The amount of crystal growth modifier required to produce desirable effect depends upon the precipitation process parameters. Most often, this amount is determined by the surface area of available hydrated alumina solids in the precipitation liquor. The solids comprise the aluminum hydroxide introduced as seed or originated as new crystals or agglomerates during the decomposition of precipitation liquor. The suitable amount of crystal growth modifier can range from about 0.01 to about 30 mg per square meter of the available aluminum hydroxide seed area, and preferably, from about 0.1 to about 15 mg per square meter. Commonly, less than about 8 mg/m2 of CGM can be used.

In case the available aluminum hydroxide area may not be reliably determined, the precipitation operators can dose the crystal growth modifier by the volume. In this case, the crystal growth modifier amount may range from about 0.01 to about 400 mg/liter of precipitation liquor, preferably from about 0.05 to about 200 mg/liter of precipitation liquor. Commonly less than about 100 mg/liter of CGM can be used.

The addition of the crystal growth modifier product to the precipitation liquor reduces the percent of alumina trihydrate crystal fines formed in the Bayer process substantially without any decrease in the overall product yield and thereby increases the yield of alumina trihydrate crystals of optimal particle size for aluminum metal production.

In one embodiment, the addition of emulsified crystal growth modifier results in at least half of the recovered crystals by weight exceed 325 mesh (44-45 microns).

The addition of crystal growth modifier also provides a more effective aluminum hydroxide production process wherein the yield of coarser alumina trihydrate particles is increased, and the separation and collection of alumina trihydrate from the alkaline liquor is improved.

The examples below are offered to aid in understanding the present invention and are not to be construed as limiting the scope thereof.

EXAMPLES

The foregoing may be better understood by reference to the following examples, which are intended to illustrate methods for carrying out the invention and are not intended to limit the scope of the invention.

Precipitation Test Procedure: Each set of tests was run using fresh pregnant liquor, obtained from the reconstitution of plant spent liquor. A desired weight of spent liquor was measured into a stainless steel beaker and the volume was reduced by evaporation to about 30%. To this a set weight of aluminum hydroxide solid was added and the mixture stirred until it was dissolved. This solution was removed from the hot plate and placed on a weighing balance and de-ionized water added until a desired weight was attained. The pregnant liquor was filtered to remove any insoluble material.

All precipitation tests were performed in 250-mL Nalgene® bottles rotated end-over-end, at 10 rpm, in an Intronics temperature-controlled water bath. The pregnant liquor having a density of 1.30 kg/L (~72° C.) was placed into the bottles by weight (200 mL=260.0 g), for improved precision. The additive was dosed, with respect to the total surface area of the seed crystals (mg/m$^2$), to the lid of the appropriate bottles using a micro-syringe and the bottles were then placed in the rotating bath for equilibration at 72° C. (20 minutes). After equilibration, the bottles were removed, quickly charged with the required quantity of seed (50 g/L, based on liquor volume) and immediately returned to the water bath. The temperature of the water bath was set to 72° C. The bottles were rotated overnight for 15 hours.

On completion of the 15 hours, the bottles were removed and for each bottle a 20-mL sample of the slurry was filtered through a syringe filter and submitted for liquor analysis. To prevent any further precipitation, 10 mL of a sodium gluconate solution (400 g/L) was added to the remaining slurry and mixed well. The solids were collected by vacuum filtration and were thoroughly washed with hot deionized water and dried at 110° C. The particle size distribution and specific surface area were determined on a Malvern Particle Sizer, which is well known in the art. The particle size distribution is conveniently given by three quantiles, d(0.1), d(0.5) and d(0.9). These represent the particle size at which the total particle volume (or mass) is less than about 10%, 50% and 90% respectively.

Example 1

The following tests were conducted to support the contention that employing the above-described products of ene and Diels Alder synthesis results in the CGM compositions with superior performance. The tests used the precipitation procedure as described above.

The green liquor with A/C ratio=0.66~0.70 was reconstituted from the spent liquor. The precipitation temperature was 72° C., holding time 15 hours, and seed charge 50 g/L. The seed was the C31 alumina trihydrate with BET specific surface area of 0.38 m$^2$/g obtained from Alcoa Inc.

The following CGM composition (Composition 1) was prepared as a 15% solution of a linseed oil derived polymer in 85% paraffinic solvent available from Exxon Mobil Corporation under the trade name Escaid 110. The linseed oil derived polymer was prepared by heat polymerizing linseed oil in presence of maleic anhydride under oxygen deficient conditions with further cross-linking using pentaerythritol. However, cross-linking using pentaerythritol may be optional. Oxygen deficient condition refers to a condition wherein oxygen is present at less than about 20% of the environment in which the polymerization occurs, including all values and ranges therein, e.g. 10%, 5%, etc.

Table 1 compares the performance of Composition 1 to the control (no CGM) and the commercial product described above. The CGM products were tested using duplicate runs at the equal dosage of 3 mg/m2 seed surface (60 ppm vs. green liquor).

TABLE 1

Coarsening Effects of Commercial Product and Composition 1 Compared.

| Example | Dose (mg/m$^2$) | Quantile Particle Size, μm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Control 1 | — | 48.2 | 77.6 | 123.5 | | | |
| Control 2 | — | 48.6 | 78.3 | 125.0 | | | |
| Average | — | 48.4 | 78.0 | 124.3 | | | |
| Commercial product | 3 | 53.6 | 86.0 | 136.5 | | | |
| Commercial product | 3 | 52.6 | 84.4 | 134.1 | | | |
| Average | 3 | 53.1 | 85.2 | 135.3 | 9.7 | 9.2 | 8.8 |
| Composition 1 | 3 | 54.1 | 87.5 | 140.0 | | | |
| Composition 1 | 3 | 54.3 | 87.7 | 140.3 | | | |
| Average | 3 | 54.2 | 87.6 | 140.2 | 12.0 | 12.3 | 12.8 |

Example 2

The CGM compositions below were tested under the same conditions as in the previous example, but were prepared using the spent liquor from a different plant.

Composition 2 (Microemulsion) Comprised of

10% Linseed oil polymerized by heat and by reaction with maleic anhydride, 5% C8-10 fatty acid blend, 30% ethoxylated propoxylated C14-C18 alcohol emulsifier, 2% polypropylene glycol blend with the molecular weight in the range from 100 to 1500 Daltons and 53% water Composition 3 (Microemulsion) Comprised of 10% Linseed oil polymerized by heat and by reaction with maleic anhydride, 5% C8-10 fatty acid blend, 20% ethoxylated propoxylated C14-C18 alcohol emulsifier, 10% C10 alcohol distillation residue, 2% polypropylene glycol blend with the molecular weight in the range from 100 to 1500 Daltons and 53% water Composition 4 (Microemulsion) Comprised of 10% Linseed oil polymerized by heat and by reaction with maleic anhydride, 5% C8-10 fatty acid blend, 20% ethoxylated propoxylated C14-C18 alcohol emulsifier, 10% paraffinic oil (dearomatized aliphatic fluid), 2% polypropylene glycol blend with the molecular weight in the range from 100 to 1500 Daltons and 53% water.

TABLE 2

Coarsening Effect Of Commercial Product And Compositions 2 and 3 Compared.

| Example | Dose (mg/m$^2$) | Quantile Particle Size, µm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Control 1 | — | 42.3 | 70.8 | 113.7 | | | |
| Control 2 | — | 43.2 | 69.5 | 113.9 | | | |
| Average | — | 42.7 | 70.1 | 113.8 | | | |
| Commercial product | 3 | 48.5 | 77.2 | 121.5 | | | |
| Commercial product | 3 | 48.8 | 77.9 | 123.3 | | | |
| Average | 3 | 48.7 | 77.6 | 122.4 | 14.1 | 10.7 | 7.6 |
| Composition 2 | 3 | 49.0 | 77.9 | 122.9 | | | |
| Composition 2 | 3 | 50.6 | 80.7 | 127.6 | | | |
| Average | 3 | 49.8 | 79.3 | 125.3 | 16.6 | 13.1 | 10.1 |
| Composition 3 | 3 | 49.6 | 78.6 | 123.4 | | | |
| Composition 3 | 3 | 48.5 | 77.1 | 124.4 | | | |
| Average | 3 | 49.1 | 77.9 | 123.9 | 15.0 | 11.1 | 8.9 |
| Composition 4 | 3 | 49.4 | 78.4 | 123.4 | | | |
| Composition 4 | 3 | 50.0 | 79.5 | 125.3 | | | |
| Average | 3 | 49.7 | 79.0 | 124.4 | 16.4 | 12.7 | 9.3 |

Example 3

The CGM compositions below were tested under the same conditions as in the previous example, but were prepared using the spent liquor from another plant.

Composition 5

15% polyisobutyl succinic anhydride and 85% mineral seal oil.

As shown in Table 1, Composition 5 provides higher coarsening of precipitated aluminum hydroxide than the existing Commercial Product.

TABLE 3

Coarsening Effect Of Commercial Product And Composition 5 Compared.

| Example | Dose (mg/m$^2$) | Quantile Particle Size, µm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Control 1 | — | 43.0 | 72.9 | 118.3 | | | |
| Control 2 | — | 43.5 | 73.0 | 120.6 | | | |
| Average | — | 43.3 | 73.0 | 120.5 | | | |
| Commercial Product | 3 | 46.5 | 77.1 | 124.6 | | | |
| Commercial Product | 3 | 46.3 | 76.9 | 126.7 | | | |

TABLE 3-continued

Coarsening Effect Of Commercial Product And Composition 5 Compared.

| Example | Dose (mg/m²) | Quantile Particle Size, μm | | | % Increase in Mean of Control Quantile Particle Size | | |
|---|---|---|---|---|---|---|---|
| | | d(0.1) | d(0.5) | d(0.9) | d(0.1) | d(0.5) | d(0.9) |
| Average | 3 | 46.4 | 77.0 | 125.9 | 7.2 | 5.5 | 4.5 |
| Composition 5 | 3 | 48.0 | 79.1 | 128.6 | | | |
| Composition 5 | 3 | 47.8 | 80.2 | 130.2 | | | |
| Average | 3 | 47.9 | 79.7 | 129.4 | 10.6 | 9.2 | 7.4 |

Example 4

The effect of the instant CGM compositions on oxalate stability was examined using the critical oxalate concentration (break-point) tests. All these tests were carried out with 250-ml Nalgene® bottles rotated end-over-end in an Intronics temperature-controlled water bath. Typically, eight bottles for each condition were used. Each bottle was filled with hot 200 ml precipitation liquor and CGM (on the lid, if required), charged with 10 gram seed (Alcoa C31 standard aluminum hydroxide blended with 0.05% oxalate powder), and mixed sufficiently. After rotating in the water bath for 30 minutes at 70° C., the bottles were taken out, quickly spiked with different amounts of concentrated oxalate solution (30 g/L sodium oxalate) and returned to the water bath. The total oxalate concentrations achieved in the liquor ranged from 0 to 5 g/L. After holding in the water bath for 17 hr at 64° C., a 10-ml sample of the supernatant of the slurry was sampled from each bottle with a syringe filter (0.45 um) for oxalate analysis using ion chromatography. From the oxalate analysis of spent liquor and final liquor, and the spiked oxalate, the smallest oxalate concentration in the initial liquor at which oxalate starts to precipitate was determined as the "Break-point" for oxalate.

The effects of Commercial Product and Compositions 1 and 5 on the critical oxalate concentration (COC) are compared in Table 4. The CGMs are dosed at 3 mg/m2 seed surface. The results show that Commercial product and Composition 2 stabilize oxalate (increase the breakpoint concentration). On the other hand, Composition 5 does not stabilize oxalate (does not change the oxalate breakpoint concentration vs. blank test).

TABLE 4

Effect of Commercial Product and Compositions 1 and 5 on Oxalate Stability (Breakpoint Data).

| Treatment | Estimated Breakpoint (g/L oxalate) |
|---|---|
| Blank | 4.27 |
| Commercial product | 4.45 |
| Composition 1 | 4.52 |
| Composition 5 | 4.27 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for recovering alumina from a precipitation liquor comprising the following:
   (i) adding to the precipitation liquor a crystal growth modifying composition comprised of an ene or Diels Alder reaction product of unsaturated polycarboxylic acids, their precursors, salts, amides, esters or blends thereof with at least one of the following: fatty acids of natural or synthetic origin; esters of said fatty acids; triglyceride oils; and polyolefins with a molecular weight in the range from about 400 to about 10,000 Daltons;
   (ii) distributing the crystal growth modifying composition through the precipitation liquor; and
   (iii) precipitating crystal agglomerates from the liquor.

2. The method of claim 1, wherein the crystal growth modifying composition further includes a diluent.

3. The method of claim 2, wherein the crystal growth modifying composition is added to the precipitation liquor in an amount sufficient to cause a change in the particle size of the precipitating crystals.

4. The method of claim 3 wherein said crystal growth modifier is applied to a precipitation liquor of a Bayer process.

5. The method of claim 3 wherein at least 50 percent of the recovered crystals by weight exceeds 325 mesh.

6. The method of claim 4, wherein the crystal growth modifying composition is added through mixing into a precipitation liquor in one or any combination of the following
   (i) to a precipitation feed liquor,
   (ii) to a seed slurry, and
   (iii) into a precipitation tank.

7. The process of claim 2, wherein the crystal growth modifying composition is added to the precipitation liquor as a microemulsion.

8. The method of claim 2 wherein the crystal growth modifying composition further includes fatty acids and esters of natural or synthetic origin including crude and processed triglyceride oils.

9. The method of claim 2 wherein the crystal growth modifying composition further includes polyisobutenyl succinic anhydrides with the molecular weight in the range from about 400 to about 10,000 Daltons.

10. The method of claim 2 wherein the diluent of the crystal growth modifying composition further includes water or water miscible organic solvents.

11. The method of claim 10, wherein the water miscible organic solvents consist of one or more of aliphatic or aromatic hydrocarbons, ketones, ethers, esters, mono- and polyhydric alcohols, carboxylic acids, and mixtures thereof.

12. The method of claim 2, wherein the diluent is an alcohol or polyol containing straight or branched alkyl groups or phenyl groups.

13. The method of claim 2, wherein the diluent is a ketone consisting of water-soluble compounds having a general formula RC(O)R', wherein R and R' are alkyl groups.

14. The method of claim 2, wherein the diluent is a carboxylic acid consisting of compounds with the formula $RCO_2H$, wherein R is a $C_6$-$C_{24}$ alkyl group.

15. The method of claim 2, wherein the diluent is a carboxylic acid ester consisting of compounds with the formula $R"CO_2R$, wherein R" is a $C_6$-$C_{24}$ alkyl group and R is a C1-C12 alkyl group.

16. The method of claim 2, wherein the crystal growth modifying composition is distributed within the precipitation liquor by the means of conventional, high shear, or ultrasonic mixing.

17. The method of claim 13, wherein the distributing of the crystal growth modifying composition comprises the addition of an ionic or nonionic surfactant into the crystal growth modifying composition.

18. The method of claim 17, wherein 0.001 to 50 percent by weight of the surfactant is added to the crystal growth modifying composition.

19. The method of claim 17, wherein 1 to 20 percent by weight of the surfactant is added to the crystal growth modifying composition.

20. The method of claim 1, wherein 50 percent to 90 percent of the crystal growth modifying composition has an molecular weight from 500 to about 10,000 Daltons.

21. The method process of claim 20, wherein the remaining amount of crystal growth modifying composition has an average molecular weight within the range of from about 10,000 to about 100,000 Daltons.

22. The method of claim 1, wherein the crystal growth modifying composition further contains a hydrophobic liquid containing at least one of the following: aliphatic hydrocarbons; aromatic hydrocarbons; and the residue of aliphatic alcohol distillation.

23. The method of claim 2, wherein said crystal growth modifier is added through mixing into a precipitation liquor in at least one location of said method for recovering alumina, wherein said location is selected from at least one of the following: a) a precipitation feed liquor, b) a seed slurry, and c) directly into a precipitation tank.

* * * * *